Sept. 4, 1956          H. T. KRAFT          2,761,489

METHOD OF MANUFACTURE OF A PNEUMATIC TIRE

Filed March 6, 1953          2 Sheets-Sheet 1

INVENTOR
*Herman T. Kraft*

BY *Evans & McCoy*
ATTORNEYS

INVENTOR
*Herman T. Kraft*
BY *Evans + McCoy*
ATTORNEYS

United States Patent Office 2,761,489
Patented Sept. 4, 1956

2,761,489

METHOD OF MANUFACTURE OF A PNEUMATIC TIRE

Herman T. Kraft, Akron, Ohio, assignor to The General Tire and Rubber Company, Akron, Ohio, a corporation of Ohio Application March 6, 1953, Serial No. 340,786

2 Claims. (Cl. 154—14)

This invention relates to a tire with a novel sidewall thereon and to a process of manufacturing it. It particularly relates to a tire having a series of concentric black ribs with intermediate grooves of a contrasting color.

There have been several attempts to make white sidewall tires more resistant to becoming dirty. Scuff ribs have been provided and do give some protection. In order to provide further increased protection, I have found that it is necessary to use a plurality of ribs and grooves over the surface of the tire. I have also found that a plurality of ribs, when smaller in width than grooves, provide a very pleasing appearance giving a sense of rotation to a still tire. Such ribs also decrease the adverse effects of dirty spots.

The manufacture of such tires originally involved the steps of painting the grooves or painting the ribs or lands. Paint was not generally satisfactory, however, because it cracked or rubbed off to show the black tire carcass. I have discovered that a very satisfactory tire can be manufactured by curing a sheet of pigmented rubber against the ribs and grooves and then buffing the rubber off of the ribs to leave it in the grooves.

It is accordingly one object of the subject invention to provide a simple and inexpensive method of manufacturing a tire having concentric lands and grooves of contrasting color.

It is another object of the subject invention to provide a durable and scuff-resistant tire sidewall comprising a series of concentric black ribs with intermediate white grooves.

It is still another object of the subject invention to provide a decorative tire sidewall construction in which the lands and grooves are arranged and proportioned so that the lands protect the grooves from wear and scuffing.

Other objects and advantages will become apparent from the following description and drawings in which like numerals relate to like parts. In the drawings, Figure 1 shows a cross-sectional view of a tire with the outside sidewall portion having a series of concentric ribs and grooves.

Figure 2:
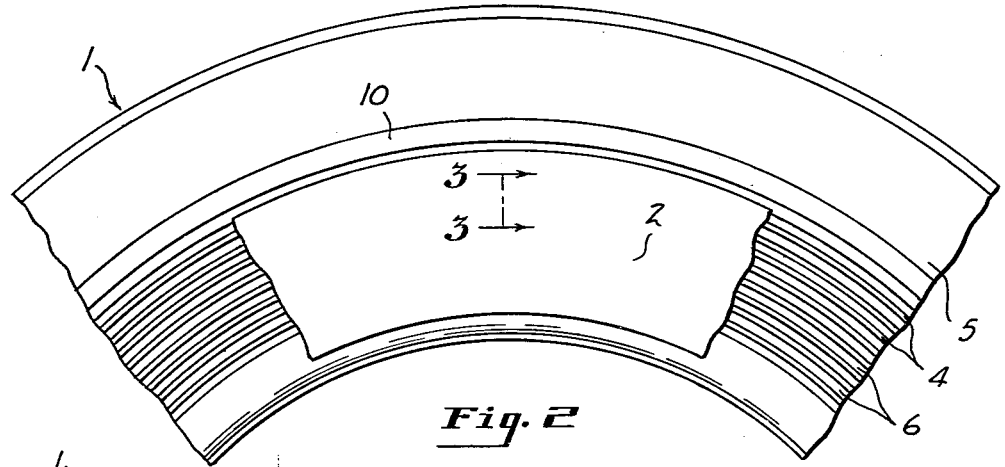
Fig. 2 is an enlarged front view of the tire of Fig. 1 with parts broken away showing a relatively thin sheet of uncured, pigmented rubber deposited over the rib-and-groove sidewall portion.
Figure 4:
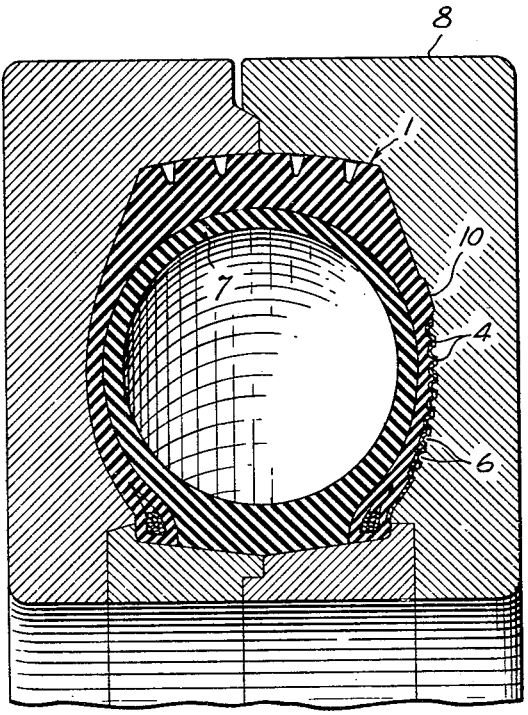
Fig. 4 is a cross-sectional view of the tire of Fig. 2 assembled in a matrix together with an air-bag.

In accordance with the subject invention, a tire 1 is provided with a sidewall portion 5 having a series of concentric ribs 4 and grooves 6. The ribs are proportioned so as to provide protection for the grooves and the grooves provide the color and design. Furthermore, a tire with this sidewall gives the appearance of motion and makes the car on which such tires are mounted appear closer to the ground.

The sidewall portion formed by the ribs 4 and grooves 6 of the subject tire occupies from about ⅓ to ½ or even ⅗ of the vertical extent of the sidewall face and extends primarily over surface portions between the points where contact is made between the rim and sidewall and the lateral crest of the sidewall. It preferably extends from a point approximately ⅜ of the distance from the bottom of the tread 13 to a point approximately ¾ of the vertical distance from the bottom of the tread. A guard rib 10 is also located approximately ⅜ of the distance from the bottom of the tread. This guard rib is preferably 3 to 5 or 6 times the width of the other ribs and preferably extends out approximately ⅛ to ¼ of an inch from the sidewall and from the face of the adjacent rib.

Figure 3:
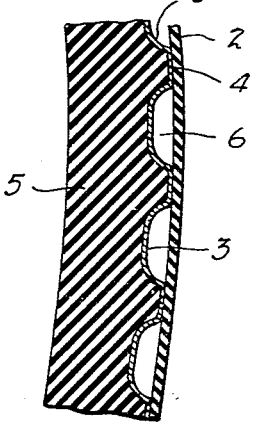
Fig. 3 is an enlarged cross-sectional view taken along line 3—3 in Fig. 2 showing the thin sheet of rubber affixed to the sidewall portion.
Figure 5:
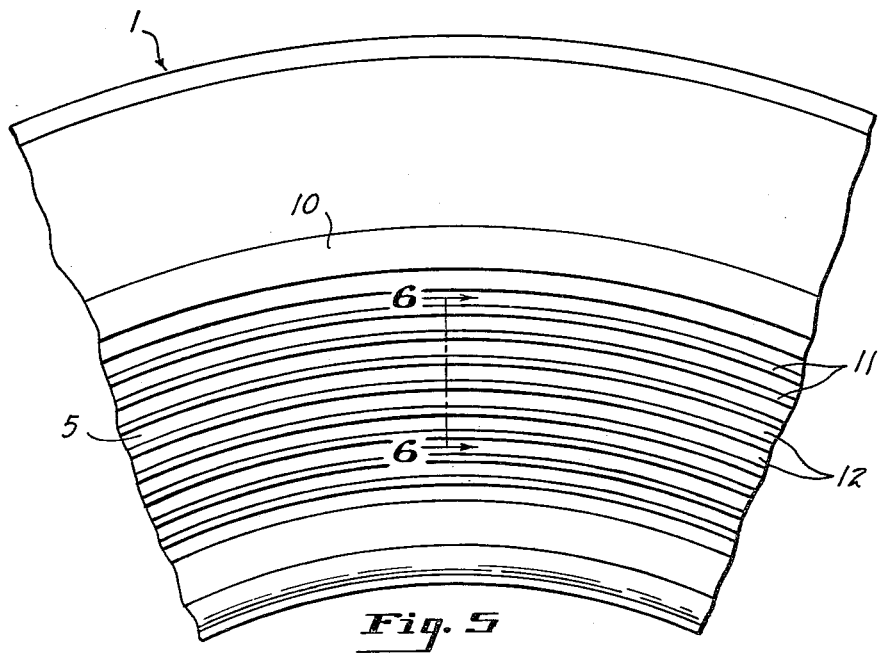
Fig. 5 is a front view showing the tire of Fig. 4 after removal from the mold and after the sheet rubber has been buffed from the rib faces.
Figure 6:
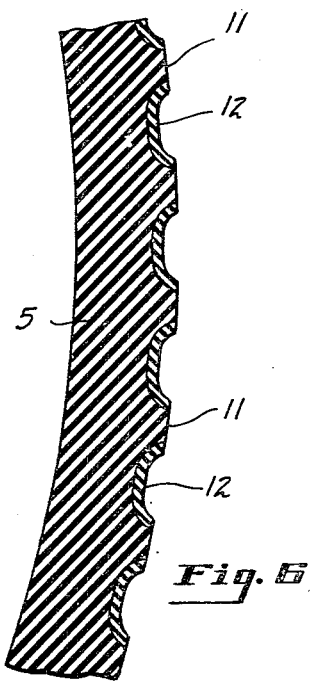
Fig. 6 is a cross-sectional view taken along line 6—6 of Fig. 5 showing a tire of the subject invention with the sheet rubber buffed from the rib faces and affixed to the groove portions of the sidewall of the tire.

In order to stand out, the width of the grooves should be from 1½ to 2 or 3 and preferably around 1½ times the width of the ribs. The ribs are preferably around ⅛ of an inch wide and the grooves are preferably around 3/16 of an inch wide. The ribs should stand out approximately 1/16 of an inch from the base of the grooves. The grooves should be rounded as shown in Fig. 3.

When the grooves and ribs are formed in such proportions, the ribs protect the grooves from scuffing against the curb and minimize dirt pick-up and accumulation. The subject sidewall construction is preferably used on the outer or exposed side of the tire only and not on both sides.

In order to manufacture this tire, a carcass 1 with a series of concentric ribs and grooves as described is cured in a mold to the elastic state. A relatively thin sheet of pigmented rubber is then affixed to the sidewall portion of the tire and the tire placed in a matrix embodying the appropriate sidewall design together with an air-bag. The air-bag is inflated and the thin sheet of uncured pigmented rubber (preferably a white side wall stock) is forced against the lands and into the grooves and cured in place therein. The tire is removed from the matrix and the sidewall is buffed so as to remove the white pigmented rubber from the face of the ribs or lands and so as to leave it in the recesses or grooves. In this way a design in which the lands are of color contrasting with that of the grooves is provided.

Figure 1:
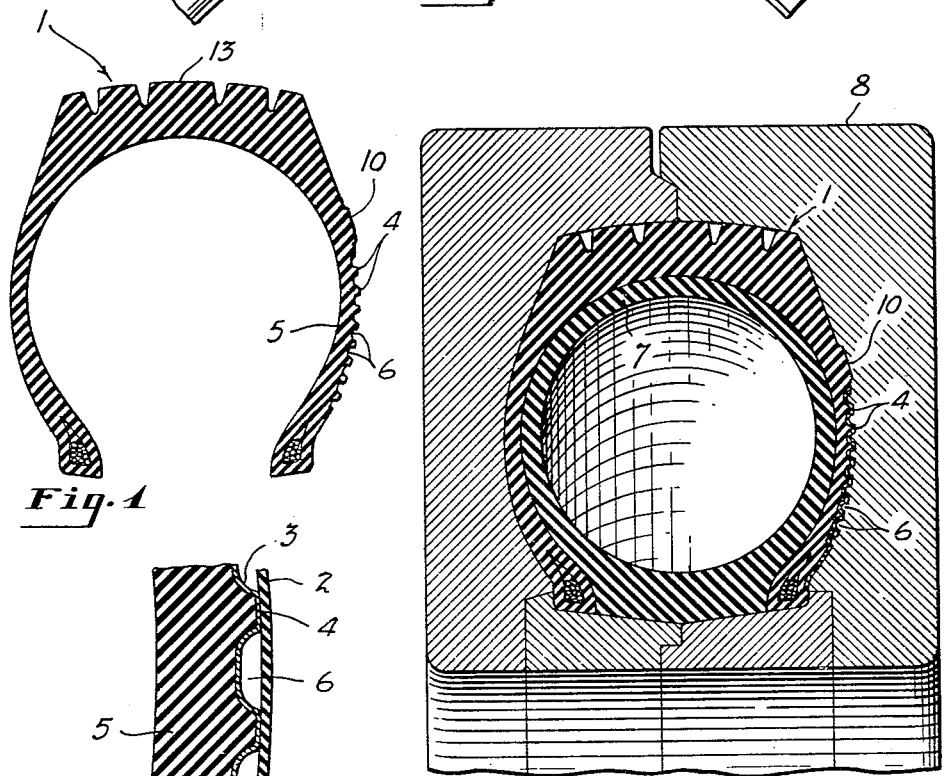

A tire 1 is provided with a series of concentric ribs 4 and grooves 6 in one sidewall thereof as shown in Fig. 1. This tire is cured or vulcanized to at least the resilient, elastic state. A thin sheet 2 of rubber pigmented with titanium dioxide or other suitable pigments is affixed to the sidewall of a cured tire 1 as shown in Fig. 2. If desired, a layer of cement 3 can be applied to the ribs and grooves of the sidewall portion 5 as shown in Fig. 3. The rubber sheet 2 sticks or is affixed to the ribs 4 and does not tend to stick to the grooves 6. It preferably extends from the guard rib 10 down to the edge of the bead. Thus there is no problem in providing an even juncture between the sheet and sidewall portion.

The tire is placed in matrix 8. The matrix is formed with the same design as that of the tire sidewall so as to interfit therewith. Air-bag 7 or equivalent presses the sidewall portion 5 out against the formation of the matrix so as to force the rubber sheet 2 into firm contact with the ribs and grooves in the sidewall. The sheet is cured against the tire sidewall portion 5 and the tire is then removed from the matrix.

The sidewall portion is then buffed so as to remove the pigmented sheet from faces of the projecting ribs or lands and leave it intact in the recessed grooves. The ribs are thus the color of the tire carcass and the grooves the color of the pigmented sheet. In this way a design in which the color of the grooves and the ribs is contrasting is provided.

It should be noted that the tire placed in the matrix must be cured to at least the elastic state. Otherwise, the pigmented sheet and tire sidewall flow and intermix and do not buff to a clean design.

The pigmented sheet is generally from $\frac{1}{16}$ of an inch to around $\frac{1}{64}$ of an inch thick. It is preferably affixed to the sidewall portion by a layer of rubber cement although it will stick to the sidewall portion because of its natural tack without cement. The white sheet is formed by pigmenting a conventional cured crude rubber mixture with around 20 parts of titanium dioxide or other suitable white pigment. The mixture is compounded so as to cure relatively rapidly. The pigmented sheet must be uncured in order to stick to the carcass in a satisfactory manner. Any white rubber compound curable to the vulcanized rubber of the tire may be used although I have found that neoprene rubbers are preferable because they are most resistant to checking and deterioration on exposure to weather and sunlight. The rubbery polymer forming the base of the white compound, like that forming the base of the tire compounds, may be any natural rubber or any other polymer of a diolefinic compound curable to natural rubber including polychloroprene, polybutadiene and its homologues, and solid non-oil resistant or hydrocarbon compatible copolymers of one or more of these with mono-olefinic compounds including isobutylene and styrenes.

It is understood that in accordance with patent statutes various modifications of the subject invention may be employed without departing from the spirit thereof.

What I claim is:

1. A process of manufacturing a tire with a sidewall portion having concentric ribs and grooves of contrasting colors comprising the steps of molding and curing a tire with a concentrically grooved and ribbed sidewall in the elastic stage, removing said cured tire from the mold and affixing a relatively thin sheet of uncured pigmented rubber to the sidewall face thereof, placing said cured tire with the sheet of uncured rubber affixed thereto in a matrix which forces said sheet against said grooves and ribs, curing said sheet in said matrix against said tire carcass, removing the tire from the matrix, and buffing the sheet from the rib faces.

2. A process of manufacturing a tire with a sidewall having a land-and-groove surface with the lands and grooves of contrasting color comprising the steps of molding and curing a tire with a land-and-groove sidewall surface, affixing a relatively thin sheet of uncured pigmented rubber to said sidewall, placing said tire with the sheet affixed thereto in a matrix which forces said sheet against said lands and into said grooves, curing said sheet in said matrix against said sidewall, removing the tire from the matrix, and buffing said sidewall surface to remove the portions of the sheet from the lands but not from the grooves.

References Cited in the file of this patent

UNITED STATES PATENTS

| D. 128,632 | Lee | Aug. 5, 1941 |
| D. 171,451 | Kraft | Feb. 9, 1954 |
| 1,448,286 | Comstock | Mar. 13, 1923 |
| 1,741,997 | Lerch | Dec. 31, 1929 |
| 1,940,077 | Coe | Dec. 19, 1933 |
| 2,130,594 | Mooradian | Sept. 20, 1938 |

FOREIGN PATENTS

| 107,666 | Great Britain | July 12, 1917 |